United States Patent
Wang et al.

(10) Patent No.: US 9,827,532 B2
(45) Date of Patent: Nov. 28, 2017

(54) ACID RESISTANT PBI MEMBRANE FOR PERVAPORATION DEHYDRATION OF ACIDIC SOLVENTS

(71) Applicant: PBI Performance Products, Inc., Charlotte, NC (US)

(72) Inventors: Yan Wang, Chaohu (CN); Michael Gruender, Charlotte, NC (US); Tai-shung Chung, Ann Arbor, MI (US)

(73) Assignee: PBI Performance Products, Inc., Charlotte, NC (US)

( * ) Notice: Subject to any disclaimer, the term of this patent is extended or adjusted under 35 U.S.C. 154(b) by 0 days.

(21) Appl. No.: 14/986,779

(22) Filed: Jan. 4, 2016

(65) Prior Publication Data

US 2016/0114291 A1    Apr. 28, 2016

Related U.S. Application Data

(62) Division of application No. 13/480,522, filed on May 25, 2012, now Pat. No. 9,283,523.

(51) Int. Cl.

| | |
|---|---|
| *B01D 39/00* | (2006.01) |
| *B01D 39/14* | (2006.01) |
| *B01D 67/00* | (2006.01) |
| *B01D 15/00* | (2006.01) |
| *B29C 44/04* | (2006.01) |
| *B01D 33/21* | (2006.01) |
| *B01D 61/36* | (2006.01) |
| *C08G 73/18* | (2006.01) |
| *B01D 71/64* | (2006.01) |
| *B01D 63/02* | (2006.01) |
| *B01D 63/08* | (2006.01) |
| *C02F 1/44* | (2006.01) |

(52) U.S. Cl.
CPC ......... *B01D 61/366* (2013.01); *B01D 61/362* (2013.01); *B01D 63/02* (2013.01); *B01D 63/08* (2013.01); *B01D 67/0006* (2013.01); *B01D 67/0083* (2013.01); *B01D 67/0093* (2013.01); *B01D 71/64* (2013.01); *C08G 73/18* (2013.01); *B01D 2323/30* (2013.01); *B01D 2325/30* (2013.01)

(58) Field of Classification Search
CPC ............................ B01D 71/82; B01D 2323/30; B01D 67/0006; B01D 69/10; B01D 69/02; B01D 71/64; C02F 1/445
See application file for complete search history.

(56) References Cited

U.S. PATENT DOCUMENTS

| RE26,065 | E | 7/1966 | Marvel et al. |
|---|---|---|---|
| 4,506,068 | A | 3/1985 | Choe et al. |
| 4,614,586 | A | 9/1986 | Masuda et al. |
| 4,634,530 | A * | 1/1987 | Kuder ................ B01D 67/0093 |
| | | | 210/500.23 |
| 4,814,530 | A | 3/1989 | Ward et al. |
| 4,818,387 | A | 4/1989 | Ikeda et al. |
| 4,933,083 | A | 6/1990 | Jones, Jr. |
| 5,264,171 | A | 11/1993 | Prasad et al. |
| 5,352,361 | A | 10/1994 | Prasad et al. |
| 6,248,469 | B1 | 6/2001 | Formato et al. |
| 6,946,015 | B2 | 9/2005 | Jorgensen et al. |
| 6,986,844 | B2 | 1/2006 | Barss et al. |
| 6,997,971 | B1 | 2/2006 | Young et al. |
| 7,384,552 | B2 | 6/2008 | Calundann et al. |
| 7,485,227 | B2 | 2/2009 | Kiefer et al. |
| 7,550,216 | B2 | 6/2009 | Ofer et al. |
| 7,582,210 | B2 | 9/2009 | Calundann et al. |
| 7,950,529 | B2 | 5/2011 | Kulkarni et al. |
| 8,277,983 | B2 | 10/2012 | Calundann et al. |
| 8,298,450 | B2 | 10/2012 | Choi et al. |
| 8,459,469 | B2 | 6/2013 | Liu et al. |
| 8,561,812 | B2 | 10/2013 | Liu et al. |
| 2003/0159980 | A1 * | 8/2003 | Barss ................ B01D 67/0006 |
| | | | 210/321.8 |
| 2004/0084365 | A1 | 5/2004 | Barss et al. |
| 2004/0262227 | A1 | 12/2004 | Kiefer et al. |
| 2005/0256296 | A1 | 11/2005 | Kiefer et al. |
| 2006/0021502 | A1 * | 2/2006 | Young ................ B01D 53/228 |
| | | | 95/45 |

(Continued)

FOREIGN PATENT DOCUMENTS

JP    S60-106504 A    6/1985

OTHER PUBLICATIONS

Membrane Technology, 1998-2009 Lenntech Water Treatment & Purification Holding B.V. Delft, The Netherlands (www.lenntech.com).
R. E. Kesting, Synthetic Polymeric Membranes, 2nd ed., John Wiley & Sons (NYC, NY), (p. 10-14), (1985).
M. Cheryan, Ultrafiltration Handbook, Technomic Publishing Co. (Lancaster, PA), (p. 127-168), (1986).
Chemical Engineering Handbook, 5th ed., McGraw-Hill Book Company, (NYC, NY), (1973), Fig. 17-38.

(Continued)

*Primary Examiner* — Ana Fortuna
(74) *Attorney, Agent, or Firm* — Hammer & Associates, P.C.

(57) ABSTRACT

A pervaporation membrane may be an acid-resistant polybenzidimazole (PBI) membrane. The acid-resistant PBI membrane may be a PBI membrane chemically modified by a process selected from the group consisting of sulfonation, phosphonation, cross-linking, N-substitution, and/or combinations thereof. The membrane may be thermally stabilized. A method for the dehydration of an acid material may include the steps of: contacting an acidic aqueous solution with a membrane of an acid-resistant polybenzidimazole; taking away a permeate stream rich in water; and taking away a concentrate steam rich in the acid material. The acidic aqueous solution may be acetic acid.

15 Claims, 2 Drawing Sheets

(56) References Cited

U.S. PATENT DOCUMENTS

| | | |
|---|---|---|
| 2007/0087248 A1 | 4/2007 | Fujibayashi |
| 2007/0151926 A1 | 7/2007 | Calundann et al. |
| 2008/0308491 A1* | 12/2008 | Haring ............... B01D 67/0079 |
| | | 210/500.21 |
| 2011/0266222 A1 | 11/2011 | Wang et al. |
| 2011/0311901 A1 | 12/2011 | Fleischhaker et al. |
| 2012/0085233 A1 | 4/2012 | Liu et al. |
| 2012/0289654 A1 | 11/2012 | Fleischhaker et al. |
| 2012/0305484 A1* | 12/2012 | Freeman ................ B01D 71/62 |
| | | 210/640 |
| 2013/0012607 A1* | 1/2013 | Calundann ............. B01D 71/62 |
| | | 521/27 |
| 2013/0105383 A1 | 5/2013 | Tang et al. |
| 2016/0114291 A1* | 4/2016 | Wang .................. B01D 61/362 |
| | | 210/490 |

OTHER PUBLICATIONS

Y. Wang et al., "Pervaporation dehydration of ethylene glycol through polybenzimidazole (PBI)-based membranes. 1. Membrane fabrication," J. Membr. Sci., (vol. 363), (p. 149-159), (2010).

T. S. Chung, (slide @ plenary discussion), NAMS (North American Membrane Society) Conference, Las Vegas, NV, Jun. 6, 2011.

* cited by examiner

| Feed (AA wt%) | Membrane | Separation factor (water/AA) | Flux (g/m²h) | T (°C) |
|---|---|---|---|---|
| 50 | SPEK-C/PVA blend membrane | 40 | 850 | 50 |
| 50 | GA cross-linked STA filled SPEK-C/PVA blend membrane on PEK-C substrate | 60 | 675 | 50 |
| 50 | PVA membrane grafted with AN & HEMA | 4 | 550 | 30 |
| 50 | Acid-resistant PBI membrane* | 6631 | 168 | 22 |
| 50 | Acid-resistant PBI membrane * | 5461 | 207 | 60 |
| 70 | SPEK-C membrane | 144 | 421 | 30 |
| 70 | SPEK-C membrane | 56 | 590 | 50 |
| 70 | PVA membrane grafted with AN & HEMA | 4 | 300 | 30 |
| 70 | Acid-resistant PBI membrane* | 8825 | 142 | 22 |
| 80 | SPEK-C membrane | 69 | 310 | 50 |
| 80 | PS hollow fiber membrane | 63.5 | 511 | 70 |
| 80 | PVC/PAN composite membrane with porous PAN support layer | 182-274 | 560-740 | 80 |
| 80 | PVC/PAN bi-layer membrane with dense PAN support layer | 5027 | 35 | 80 |
| 80 | Acid-resistant PBI membrane * | 13,000 | 121 | 22 |
| 90 | poly(4-methyl-1-pentene) membrane modified with 4-vinylpyridine | 807 | 68 | 25 |
| 90 | PVA membrane grafted with AN | 14.6 | 90 | 30 |
| 90 | PVA-silicone hybrid membrane cross-linked by TEOS using sol-gel method | 1116 | 33.3 | 30 |
| 90 | PVA cross-linked by malic acid | 670 | 48 | 40 |
| 90 | SPEK-C/PVA blend membrane | 59.3 | 492 | 50 |
| 90 | GA cross-linked STA filled SPEK-C/PVA blend membrane on PEK-C substrate | 91.2 | 592 | 50 |
| 90 | PVA cross-linked by PAA | 795 | 5.6 | 30 |
| 90 | PVA membrane cross-linked by amic acid based on m-phenylene diamine | 176 | 12 | 30 |
| 90 | Acid-resistant PBI membrane * | 24,000 | 98 | 22 |
| 95 | Acid-resistant PBI membrane * | 39,000 | 86 | 22 |

*Present Invention (e.g., sulfonated PBI, SPBI)

Figure 2

ACID RESISTANT PBI MEMBRANE FOR PERVAPORATION DEHYDRATION OF ACIDIC SOLVENTS

RELATED APPLICATION

This application is a divisional application of and claims the benefit of co-pending U.S. application Ser. No. 13/480,522 filed May 25, 2012, incorporated herein by reference.

FIELD OF THE INVENTION

An acid-resistant PBI membrane is used for the dehydration of an acidic solvent, e.g., acetic acid, via membrane-based pervaporation.

BACKGROUND OF THE INVENTION

Pervaporation is a process for the separation of liquid mixtures by partial vaporization through a membrane. The separation process has two steps: first, one component of the mixture permeates away from the mixture through the membrane (the escaping component is called the permeate, and the remaining mixture is called the retentate or concentrate); and second, the permeate evaporates away from the membrane. *Pervaporation*, Wikipedia (Mar. 10, 2010).

The efficacy of the pervaporation membrane may be determined by the membrane's selectivity (expressed as separation factor) and productivity (expressed as flux). Flux refers to the rate of flow or transfer of permeate from the mixture to vapor, and denotes a quantity of permeate that crosses a unit of area of a given surface in a unit of time. Separation factor refers to the membrane's ability to selectively remove more of one mixture component than the other component(s) of the mixture. Productivity and selectivity are membrane-dependent. *Membrane technology*, © 1998-2009 Lenntech Water Treatment & Purification Holding B.V., Delft, the Netherlands (www.lenntech.com).

US Publication 2011/0266222 discloses a method to dehydrate organic liquid (e.g., ethylene glycol, EG) by pervaporation using a PBI permselective hollow fiber. The PBI permselective layer of the hollow fiber is not chemically modified to make it acid resistant.

The dehydration of acidic solvents is an important commercial operation. One acidic solvent, acetic acid, is among the top 50 chemicals based upon production quantity. Currently, the dehydration of acidic solvents, e.g., acetic acid, is carried out by a binary distillation. This separation method, however, is difficult as acetic acid and water have very close volatilities. As such, more energy is required to achieve acetic acid with purity higher than 95 wt % due to the need for greater reflux and a larger distillation column with many stages. In view of these disadvantages of distillation, research emphasis has been placed on the pervaporation dehydration of acetic acid. More specifically, research has focused on developing a membrane that gives a reasonable flux and has a good separation factor. In pervaporative dehydration, a significant number of pervaporation dehydration membranes are made from cross-linked polyvinyl alcohol (PVA), chitosan, and cellulose acetate.

Accordingly, there is a need for new and better pervaporation membranes, particularly, pervaporation membranes for dehydration, and the dehydration of acidic solvents, such as acetic acid.

SUMMARY OF THE INVENTION

A pervaporation membrane may be an acid-resistant polybenzidimazole (PBI) membrane. The acid-resistant PBI membrane may be a PBI membrane chemically modified by a process selected from the group consisting of sulfonation, phosphonation, cross-linking, N-substitution, and/or combinations thereof. The membrane may be thermally stabilized. A method for the dehydration of an acid material may include the steps of: contacting an acidic aqueous solution with a membrane of an acid-resistant polybenzidimazole; taking away a permeate stream rich in water; and taking away a concentrate steam rich in the acid. The acidic aqueous solution may be acetic acid.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 2 is a chart comparing the separation factor and flux at various temperature of known pervaporation membranes used to dehydrate acetic acid to the present invention.

DESCRIPTION OF THE INVENTION

Figure 1:
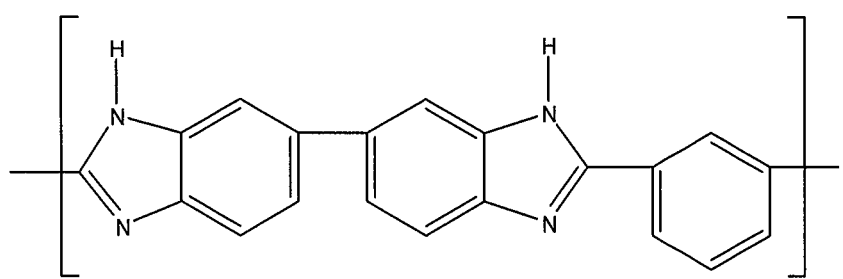
FIG. 1 is a schematic illustration of a representative polybenzimidazole (PBI) molecule.

In a membrane separation process, an influent stream is separated into two effluent streams known as the permeate and the concentrate (or retentate). The permeate is the portion of the influent stream passing through the semi-permeable membrane, whereas the concentrate stream contains the constituents that have been rejected by the membrane. This separation may be conducted in a membrane contactor where the influent stream is contacted with the membrane and the permeate and the concentrate are taken away from the contactor. The membrane may be flat membrane, a multi-layer flat membrane (e.g., a dual layer membrane), a hollow fiber membrane, a multi-layer hollow fiber membrane (e.g., a dual layer membrane), or tubular. In the multi-layer hollow fiber and tubular membranes, one layer is the membrane used in the separation and another membrane may be a support membrane.

In the instant membrane separation process, an acid-resistant polybenzimidazole (PBI) membrane may be used to dehydrate an acidic solvent. Acidic solvents (or polar protic solvents) may include, but are not limited to, methanol, ethanol, n-butanol, isopropanol, n-propanol, acetic acid, formic acid, hydrogen fluoride, and ammonia. In one embodiment, the acidic solvent may be acetic acid.

Polybenzimidazole (PBI) may be any PBI. PBI also refers to blends of PBI with other polymers, co-polymers of PBI, and combinations thereof. In one embodiment, the PBI component is the major (i.e., at least 50 wt %) component. A representative (non-limiting) illustration of the PBI molecule is set forth in FIG. 1. PBI also refers to, for example, the product of the melt polymerization of an tetraamine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. Re 26065; 4,506,068; 4,814,530; and US Publication No. 2007/0151926, each of which is incorporated herein by reference. PBI is commercially available from PBI Performance Products, Inc. of Charlotte, N.C.

The aromatic and heteroaromatic tetra-amino compounds, used in accordance with the invention, are preferably 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the invention, are dicarboxylic acids or its esters, or its anhydrides or its acid chlorides. The term "aromatic carboxylic acids" equally comprises heteroaromatic carboxylic acids as well. Preferably, the aromatic dicarboxylic acids are isophthalic acid, terephthalic acid, phthalic acid, 5-hydroxy-isophthalic acid, 4-hydroxyisophthalic acid, 2-hydroxy-terephthalic acid, 5-aminoisophthalic acid, 5-N,N-dimethyl-aminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the invention, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. Preferably, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides.

The aromatic and heteroaromatic diaminocarboxylic acid used in accordance with the invention is preferably diaminobenzoic acid and its mono- and dihydrochloride derivatives.

Preferably, mixtures of at least 2 different aromatic carboxylic acids are used. These mixtures are, in particular, mixtures of N-heteroaromatic dicarboxylic acids and aromatic dicarboxylic acids or their esters. Non-limiting examples are isophthalic acid, terephthalic acid, phthalic acid, 2,5-dihydroxyterephthalic acid, 2,6-dihydroxy-isophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. Preferably, it is the diphenyl isophthalate (DPIP) and its ester.

Examples of polybenzimidazoles which may be prepared according to the process as described above include:
poly-2,2'-(m-phenylene)-5,5'-bibenzimidazole;
poly-2,2'-(biphenylene-2"2"')-5,5'-bibenzimidazole;
poly-2,2'-(biphenylene-4"4"')-5,5'-bibenzimidazole;
poly-2,2'-(1",1",3"trimethylindanylene)-3"5"-p-phenylene-5,5'-bibenzimidazole;
2,2'-(m-phenylene)-5,5'-bibenzimidazole/2,2-(1",1",3"-trimethylindanylene)-5",3"-(p-phenylene)-5,5'-bibenzimidazole copolymer;
2,2'-(m-phenylene)-5,5-bibenzimidazole-2,2'-biphenylene-2",2"'-5,5'-bibenzimidazole copolymer;
poly-2,2'-(furylene-2",5")-5,5'-bibenzimidazole;
poly-2,2'-(naphthalene-1",6")-5,5'-bibenzimidazole;
poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2"-(m-phenylene)-5,5"-di(benzimidazole)propane-2,2; and
poly-ethylene-1,2-2,2"-(m-phenylene)-5,5"-dibenzimidazole)ethylene-1,2 where the double bonds of the ethylene groups are intact in the final polymer. Poly-2,2'-(m-phenylene)-5,5'-bibenzimidazole, a preferred polymer, can be prepared by the reaction of 3,3',4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

Acid-resistant PBI refers to a chemically modified PBI that is resistant to acids. The acid-resistant PBI has greater resistance to adsorbing (or imbibing) the acidic solvent to be dehydrated than the same non-acid-resistant PBI. In other words, PBI's inherent affinity for acid is decreased so that its separation efficiency is increased. The acid-resistant PBI may be obtained by any modification method. Such modifications methods may include, without limitation, cross-linking, N-substitution, sulfonation, phosphonation, and combinations thereof. This modification may be at the surface (if, for example, the PBI is in the form of a sheet, fiber, hollow fiber, or tube) or may be throughout the shaped PBI (if, for example, the PBI is made acid-resistant prior to being shaped). There may be several routes for each of the foregoing modifications. For example, there are at least three ways to sulfonate (i.e., add a sulfate group to the PBI polymer backbone). They include, without limitation, i) direct sulfonation of the PBI structure, ii) chemical grafting of the monomers with sulfate group, and iii) sulfonation following radiation grafting of monomer groups. Hereinafter, the invention will be described with reference to a PBI film where the surface of the film is directly sulfonated, it being understood that the invention is not so limited.

In general, the PBI film may be made in any fashion. In one embodiment, the PBI film is a solid film without pores or micropores. For example, the film may be cast from a PBI solution. Solvents for the PBI polymer may include, without limit, DMAc, N-methyl pyrrolidinone (NMP), N,N-dimethylformamide (DMF), dimethyl sulfoxide (DMSO), and combinations thereof. The PBI solution, in one embodiment, may contain 10-45 wt % PBI, and in others, 12-30 wt % PBI, and 14-28 wt % PBI. In one embodiment, the casting solution is degassed, cast onto a substrate, then the solvent is driven from the cast film, and the solvent-free cast film is vacuum-dried and cooled.

The cast PBI film may then be chemically modified to be acid-resistant. In one embodiment, the film may be sulfonated. The film may be immersed in a sulfuric acid (e.g., concentration up to 20 wt % or 1-20 wt %, or 2-15 wt %, or 2-10 wt % or 2-6 wt %) at a given temperature (e.g., from 30-80° C., or 40-70° C., or 45-55° C.) for given time (e.g., 1-4 hours, or 1.5-3.5 hours or 1.75-2.5 hours). Thereafter, excess acid may be removed from the surface of the film.

Optionally, the sulfonated film may be thermally stabilized. During this thermal stabilization, the sulfonated film is heated to a given temperature (e.g., 300-500° C., or 350-450° C., or 400-450° C.) for a given time (e.g., up to 5 minutes, or 0.3-4.5 minutes, or 0.5-1.5 minutes).

Thereafter, the sulfonated film may be freed of trace sulfonate groups. This may be accomplished by immersing the sulfonated film in boiling water for a give time (e.g., 1-5 hours, or 2-4 hours, or 2.5-3.5 hours). Then, this film may be dried to remove any adsorbed water molecules by placing the film in a vacuum oven.

A contactor may be used to house the foregoing membranes. Contactors are known and may include: plate-and-frame modules, tubular modules, hollow fiber modules, and spiral wound modules. See for example: "Membrane technology," *Wikipedia, The Free Encyclopedia* (2012); Kesting, R. E., *Synthetic Polymeric Membranes, 2nd Edition*, John Wiley & Sons, NYC, N.Y. (1985), pages 10-14; Cheryan, M., *Ultrafiltration Handbook*, Technomic Publishing Co., Lancaster Pa. (1986), pages 127-168; and *Chemical Engineering Handbook, 5th Edition*, McGraw-Hill Book Company, NYC, N.Y. (1973), FIG. 17-38, U.S. Pat. Nos. 5,264,171 and 5,352,361, each of which is incorporated herein by reference.

A dehydration system may comprise one or more of the foregoing contactors or other equipment containing the foregoing membranes that are used to dehydrate the aqueous acidic solvent. For example, a plurality of contactors, arranged in series or parallel or a combination of both, and associated equipment (e.g., pumps, control/monitoring equipment, and vacuum pumps) are assembled for the purpose of dehydrating the aqueous acidic solvent.

The aqueous acidic solvent may be dehydrated by contacting an acidic aqueous solution with a membrane comprising an acid-resistant polybenzidimazole; taking away a permeate stream rich in water; and taking away a concentrate steam rich in the acid. In one embodiment, the permeate stream is coupled to a vacuum. The feed concentration of the acidic aqueous solution may be, in one embodiment, any concentration. In other embodiments, the feed concentration may range from 50-95 wt %, or 75-95 wt %, or 78-92 wt %. The operating temperature during the dehydration may be, in one embodiment, any temperature. In other embodiments, the temperature may range from 20-85° C., or 25-75° C.

In FIG. 2, there is a comparison of separation factor and flux at various temperatures between the acid-resistant PBI disclosed herein and other known membranes for acidic solvents (e.g., acetic acid).

While the examples below are directed to the pervaporative dehydration of the acidic solvent, acetic acid, the invention is not so limited. The acid-resistant membrane may be used in other pervaporation processes or dehydration processes.

The invention will be further illustrated in the following non-limiting examples.

EXAMPLES

Materials

Polybenzimidazole (PBI) was used in the fabrication of the membranes. PBI polymer solution was provided by PBI Performance Products, Inc. with the composition of PBI 26.2 wt %, dimethylacetamide (DMAc) 72.3 wt %, and lithium chloride (LiCl) 1.5 wt %.

Concentrated sulfuric acid ($H_2SO_4$) of analytical grade, obtained from Merck was used to mix with de-ionized water to prepare the sulfonation solution with varied concentration.

Membrane Preparation Procedures

A dense flat-sheet PBI membrane with sulfonation modification on the membrane surface was prepared. The flat-sheet PBI dense membrane is cast from a 15 wt % PBI polymer solution in DMAc. The polymer dope solution of PBI/DMAc/LiCl (15/84.1/0.9 wt %) is prepared by diluting the supplied PBI solution. The diluted solution is allowed to degas overnight prior to casting onto a glass plate with a casting knife at a thickness of about 70-100 μm. The as-cast membrane is then placed on a hot plate preset at 75° C. for 15 hours, to allow the solvent evaporated slowly. The resultant film is carefully peeled off from the glass plate and then dried in a vacuum oven between two wire meshes, with temperature gradually increased to 250° C. at a rate of 0.6° C./min and held there for 24 hours to remove the residual solvents before cooling down naturally. The wire meshes not only prevent the membrane from sticking to the glass plate but also help uniformly dry the membrane from both surfaces. With this drying protocol, the LiCl remains in the as-fabricated PBI membrane.

Modification of the PBI membrane is a combination of sulfonation and thermal treatment. PBI membranes were immersed in a sulfuric acid aqueous solution of a fixed concentration at 50° C. for 2 hours. They were subsequently dried using filter paper to remove the excess sulfuric acid on their surface. The PBI membranes were then thermally treated by placing them in a furnace pre-set at 450° C. for a fixed time in air (without vacuum). Thereafter, the samples were immersed in boiling water for 3 hours to remove traces of sulfate groups and dried between two wire meshes at 100° C. in the Binder programmable vacuum oven to remove adsorbed water molecules. A Mitutoyo micrometer was then employed to measure the final membrane thickness, which was about 15-20 μm.

Pervaporation Experiments

A static pervaporation cell was used to test flat-sheet dense membrane performance at room temperature. Also see: Y. Wang, M. Gruender, T. S. Chung, Pervaporation dehydration of ethylene glycol through polybenzimidazole (PBI)-based membranes. 1. Membrane fabrication, *J. Membr. Sci.* 363 (2010) 149-159, incorporated herein by reference. A testing membrane was placed in the stainless steel permeation cell with an effective surface area of 15.2 cm². The system was stabilized for 2 hours before the collection of samples. Thereafter, permeate samples were collected by a cold trap immersed in liquid nitrogen. The samples were weighted. The sample compositions were analyzed with three parallel injections by a Hewlett-Packard GC 7890 A with a HP-INNOWAX column (packed with cross-linked polyethylene glycol) and a TCD detector. Finally, the data of flux and composition were averaged. The feed content varied less than 0.5 wt % during the entire experiment and can be therefore considered as constant during the experiment because of the large quantity of feed solution comparing to the permeate sample. The feed flow rate was maintained at 1.38 l/min. The operating temperature was room temperature (22±2° C.) unless stated otherwise. The permeate pressure was maintained at less than 3 mbar by a vacuum pump, unless it is stated. Flux and separation factors were calculated by the following equations:

$$J = \frac{Q}{At} \quad (1)$$

$$\alpha_{2/1} = \frac{y_2/y_1}{x_2/x_1} \quad (2)$$

where, J is the flux, Q is the total mass transferred over time t (hour), A the membrane area (m²), subscripts 1 and 2 refer to acetic acid and water, respectively; $y_w$ and $x_w$ are the weight fractions of components in the permeate and feed, respectively, and were analyzed through a Hewlett-Packard GC 7890 A with a HP-INNOWAX column (packed with cross-linked polyethylene glycol) and a TCD detector.

Pervaporation Examples

The present examples in pervaporation application are intended to help illustrate the process of the present invention. The flux of permeate in all examples for acetic acid (AA) dehydration through the flat-sheet dense membranes is given in unit of g·μm/m²·hr, which is normalized by the membrane thickness.

Examples 1-4 demonstrate the pervaporation performance of the sulfonated PBI dense membranes with the effect of varying sulfuric acid concentration for the feed composition of AA/H₂O (50/50 wt %). The post thermal treatment is carried at 450° C. for 30 seconds.

Examples 1-4

| Sulfuric acid concentration (wt %) | Permeate (AA wt %) | Flux (g/m²hr) | Separation factor (water/AA) |
|---|---|---|---|
| original | 13.60 | 100 | 7 |
| 0 | 14.91 | 49 | 7 |
| 2.5 | 0.015 | 168 | 6631 |
| 5 | 0.014 | 138 | 7156 |
| 10 | 27.06 | 99 | 27 |

The results show the pervaporation performance of the dense PBI membranes in its neat form is quite poor. The separation factor is less than 10 and the total flux is about 100 g/m² hr. With sulfonation of the PBI membrane, both the flux and separation factor are significantly improved.

Examples 5-10 demonstrate the pervaporation performance with the effect of varying post thermal treatment duration after sulfonation, for pervaporation dehydration of acetic acid with the feed composition of AA/H₂O (50/50 wt %). All PBI membranes were sulfonated in 2.5 wt % sulfuric acid solution for 2 hours before thermal treatment. The thermal treatment after the sulfonation stabilizes the sulfonated structure.

Examples 5-10

| Thermal treatment duration (seconds) | Permeate (AA wt %) | Flux (g/m²hr) | Separation factor (water/AA) |
|---|---|---|---|
| 0 | 3.247 | 96 | 30 |
| 10 | 6.309 | 110 | 46 |
| 20 | 0.016 | 124 | 6348 |
| 30 | 0.015 | 168 | 6631 |
| 60 | 0.019 | 201 | 5341 |
| 120 | 1.15 | 114 | 86 |

In Examples 11-16, the effect of feed composition on the normalized total flux and separation factor of the sulfonated PBI membranes is demonstrated with the pervaporation operation at room temperature. All PBI membranes were sulfonated with 2.5 wt % sulfuric acid solution for 2 hours and thermal treated at 450° C. for 30 seconds.

Examples 11-16

| Feed composition (AA wt %) | Permeate (AA wt %) | Flux (g/m²hr) | Separation factor (water/AA) |
|---|---|---|---|
| 50 | 0.015 | 168 | 6631 |
| 60 | 0.022 | 151 | 6692 |
| 70 | 0.027 | 142 | 8825 |
| 80 | 0.030 | 121 | 13,000 |
| 90 | 0.036 | 98 | 24,000 |
| 95 | 0.040 | 86 | 39,000 |

The separation factor for feeds with 80 and 90 wt % of acetic acid are assigned an arbitrarily value of greater than 10,000 as the permeate contains less than 0.05 wt % of acetic acid. From the results, the separation factor generally increases with the increase in acetic acid concentration in the feed up to 90 wt % of acetic acid and then decreases slightly. On the other hand, the flux generally decreases for feed containing between 50 and 95 wt % of acetic acid.

In Examples 17-20, the effect of operating temperature on the normalized total flux and separation factor of the sulfonated PBI membranes is demonstrated with the feed composition of AA/water (50/50 wt %). All PBI membranes were sulfonated with 2.5 wt % sulfuric acid solution for 2 hours and thermal treated at 450° C. for 30 seconds. The total flux increases while separation factor decreases with the operational temperature.

Examples 17-20

| Operation temperature (° C.) | Permeate (AA wt %) | Flux (g/m²hr) | Separation factor (water/AA) |
|---|---|---|---|
| 25 | 0.0151 | 168 | 6631 |
| 40 | 0.0164 | 203 | 6215 |
| 60 | 0.0183 | 207 | 5461 |
| 80 | 0.0195 | 276 | 5110 |

The present invention may be embodied in other forms without departing from the spirit and the essential attributes thereof, and, accordingly, reference should be made to the appended claims, rather than to the foregoing specification, as indicating the scope of the invention.

We claim:

1. A pervaporation membrane for the dehydration of acetic acid comprising:
   an acid-resistant polybenzimidazole (PBI) membrane being a PBI membrane chemically modified by a process selected from the group consisting of sulfonation, phosphonation, N-substitution, and/or combinations thereof, and having an acetic acid separation factor of at least 86.

2. The pervaporation membrane of claim 1 wherein the acetic acid separation factor is at least 5110.

3. The pervaporation membrane of claim 1 wherein the acetic acid separation factor is at least 24,000.

4. The pervaporation membrane according to claim 1 wherein said acid-resistant PBI membrane further being cross-linked.

5. The pervaporation membrane according to claim 1 wherein said membrane being: a flat membrane, a multi-layer flat membrane, a hollow fiber membrane, or a multi-layer hollow fiber membrane.

6. The pervaporation membrane according to claim 5 wherein said multi-layer flat membrane having one layer being the acid-resistant PBI membrane and another layer being a microporous support layer.

7. The pervaporation membrane according to claim 5 wherein said multi-layer hollow fiber membrane having one layer being the acid-resistant PBI membrane and another layer being a microporous support layer, the PBI layer being either the inner or outer layer.

8. The pervaporation membrane according to claim 1 wherein said membrane being thermally stabilized.

9. The pervaporation membrane according to claim 1 wherein said PBI membrane being chemically modified by a sulfonation process.

10. A membrane contactor comprising the membrane of claim 1.

11. A dehydration system comprising the membrane of claim 1.

12. A method of making a pervaporation membrane, the membrane is an acid-resistant polybenzimidazole (PBI) membrane, comprising the steps of:
    forming a PBI film from a solution of PBI polymer;
    chemically modifying the PBI film by a process selected from the group consisting of sulfonation, phosphonation, N-substitution, and/or combinations thereof; and
    thermally stabilizing the modified PBI film in air,
    the membrane having an acetic acid separation factor of at least 86.

13. The method of claim 12 further comprising the step of: cross-linking the modified PBI film.

14. The method of claim 12 wherein the PBI film being chemically modifying by a sulfonation process.

15. A pervaporation membrane for the dehydration of acetic acid comprising:
    an acid-resistant polybenzimidazole (PBI) membrane being a PBI membrane chemically modified by a sulfonation process, and having an acetic acid separation factor of at least 86.

* * * * *